United States Patent [19]

Gustafsson

[11] 4,024,728
[45] May 24, 1977

[54] METHOD OF AND AN INSTALLATION FOR CONTROLLING THE TEMPERATURE OF A PLURALITY OF ROOMS HAVING MUTUALLY DIFFERING AND VARYING HEATING REQUIREMENTS, AMONGST WHICH ROOMS THERE IS NORMALLY A COOLING REQUIREMENT

[75] Inventor: Berth Ulrik Gustafsson, Osterskar, Sweden

[73] Assignee: Projectus Industriprodukter AB, Stockholm, Sweden

[22] Filed: Jan. 20, 1976

[21] Appl. No.: 650,731

[30] Foreign Application Priority Data

Feb. 18, 1975 Sweden .......................... 75018077

[52] U.S. Cl. .................................. 62/79; 62/238; 62/324
[51] Int. Cl.² ..................... F25B 7/00; F25B 27/02; F25B 13/00
[58] Field of Search ................ 62/79, 238, 335, 324

[56] References Cited

UNITED STATES PATENTS

| | | | |
|---|---|---|---|
| 2,122,013 | 6/1938 | Smith | 62/79 |
| 2,295,983 | 9/1942 | Williams | 62/79 |
| 2,619,326 | 11/1952 | McLenegan | 62/238 |
| 2,690,656 | 10/1954 | Cummings | 62/79 |
| 2,718,766 | 9/1955 | Imperatore et al. | 62/79 |
| 3,802,218 | 4/1974 | Yoshiro | 62/324 |
| 3,867,979 | 2/1975 | Carrasse et al. | 62/79 |

*Primary Examiner*—Lloyd L. King
*Attorney, Agent, or Firm*—Burns, Doane, Swecker & Mathis

[57] ABSTRACT

There is provided a method and an apparatus for controlling the temperature of a plurality of rooms having mutually different and varying heat requirements, among which rooms at least one normally has a cooling requirement.

The common input air flow to the rooms passes a heat exchanger and is cooled to the requisite temperature for the room having a cooling requirement, while the separate input air flows to the respective rooms are afterheated by means of after heating banks, one for each room, to the desired temperature. The heat exchanger is, or is connected to, an evaporator in a refrigerator (heat pump) the condenser of which is located in the common output airflow from the rooms. The heating banks are heat supplied by part of the condensation heat of the refrigerant vapor.

When the cooling requirement for the room having the lowest heat input requirement is replaced by a heating requirement, the heat exchanger is switched to function as a condenser in the refrigerator circuit and the condenser is switched to function as an evaporator in the refrigerator, while the heating banks remain as condenser units.

6 Claims, 4 Drawing Figures

METHOD OF AND AN INSTALLATION FOR CONTROLLING THE TEMPERATURE OF A PLURALITY OF ROOMS HAVING MUTUALLY DIFFERING AND VARYING HEATING REQUIREMENTS, AMONGST WHICH ROOMS THERE IS NORMALLY A COOLING REQUIREMENT

The present invention relates to a method of controlling the temperature of a plurality of rooms which have mutually varying and differing heating requirements, among which rooms there is normally a cooling requirement, said method comprising utilising a refrigerator comprising a refrigerant circuit with an evaporator system, a compressor and a condenser system in order to supply a heat content to the common airflow entering the rooms, this by heat exchange with the evaporator system, corresponding to the requirement of the room having the lowest heat requirement per supply unit volume of air, and after-heating the airflows flowing into the respective rooms, to the requisite extent, and to a system for implementing said method.

In large office blocks, supermarkets and factories, for example, there is frequently a cooling requirement over a major part of the year, in at least some rooms, while other rooms may have a heating requirement. It is convenient in such situation to temperature control the inlet airflow to several rooms in a common system.

In accordance with the prior art, that room which has the lowest heat requirement per input unit volume of air is allowed to determine the temperature level of the air leaving the central system. At the respective air intakes to the various rooms; after-heater units are provided, said units being controlled by thermostats located in the respective rooms since the heat requirement of the different rooms can vary very substantially due to the heat input in the form of body heat and heat from light fittings.

In some instances, where there are large numbers of people in the same room and a high lighting intensity, there is a cooling requirement over a major part of the year. In Sweden, it is really only the coldest of the winter months, December, January and February, which require heating.

Hitherto, therefore, in a situation where there is cooling requirement, the cooling system has been operated in the conventional way and the heat from the refrigerator condenser has been supplied to the external air through cooling towers or roof-mounted flanged condenser units. The after-heater units have been heated up by circulated hot water coming from an oil-fired boiler installation or a remote heating network. In the heat requirement situation, the refrigerator has been halted and the input air heated using circulated hot water, in the aforementioned manner.

One object of the present invention is to reduce the heat waste, especially in the cooling situation, which occurs in the known methods and systems where heat is extracted from the input air, this heat dissipated to the external air and then heat from an oil-fired source or remote heating source added in after-heating units.

In accordance with the invention, the method referred to in the introduction is characterised in that, in a first heat-exchanger, part of the heat of condensation produced in the refrigerator is utilised to after-heat the input airflows to the different rooms; in that, in a second heat-exchanger, another part of the heat of condensation developed in the refrigerator is dissipated to the environment, preferably to the common exit airflow from the rooms; and in that, when the cooling requirement is replaced by a heating requirement, the evaporator system is disconnected, the second heat-exchanger connected as an evaporator instead, and the first heat exchanger is arranged also to heat up the common input air to the rooms.

In this context, part of the heat content of the warm refrigerant leaving the compressor of the refrigerator can be utilised to evaporate the refrigerant in a heat pump whose heat of condensation is utilised for hot water production and possibly for the after-heating of the respective input airflows to the different rooms.

The apparatus in accordance with the invention, for the execution of the said method, incorporates a refrigerator comprising a refrigerant circuit with an evaporator device, a compressor and a condenser device, the evaporator device being designed to provide the common input airflow to the rooms with a heat content corresponding to the requirement of that room which has the lowest heat requirement per injected unit volume of air, after-heater units being arranged in the input airflows to the respective other rooms, in order to carry out any necessary after-heating thereof.

The significant features of this arrangement are that at least part of the hot refrigerant leaving the compressor of the refrigerator is arranged to be condensed in a liquid-cooled condenser, at least part of the thus heated liquid being destined for supply to the after-heater units; that at least another part of the hot refrigerant is arranged to be condensed in a second condenser preferably arranged in a heat-exchanging relationship with the common exit airflow from the rooms; that the evaporator device is arranged in a heat-exchanging relationship with a liquid system coupled to a heat-exchanger bank in the common input airflow; and that coupling means are provided in order, when the cooling requirement is replaced by a heating requirement, to disconnect the evaporator device, connect the second condenser as an evaporator and connect the liquid system of the evaporator device to the liquid system of the liquid-cooled condenser.

Possibly a heat pump containing a refrigerant circuit and a compressor, a condenser and an evaporator, can be arranged with its evaporator in a heat-exchanging relationship with the warm refrigerant leaving the compressor of the refrigerator, so that the heat pump condenser can heat up tap water.

Furthermore, an auxiliary heat source can be arranged to, if required, afterheat the liquid flowing from the liquid-cooled condenser to the after-heating units.

The liquid referred to is normally water.

The invention will be described in more detail hereinafter making reference to the attached drawing.

FIG. 1 schematically illustrates an apparatus in accordance with the invention connected to a ventilation system for a plurality of rooms.

FIG. 2 schematically illustrates a refrigerator and heat-exchanger, belonging to the apparatus in accordance with the invention.

Figure 1:
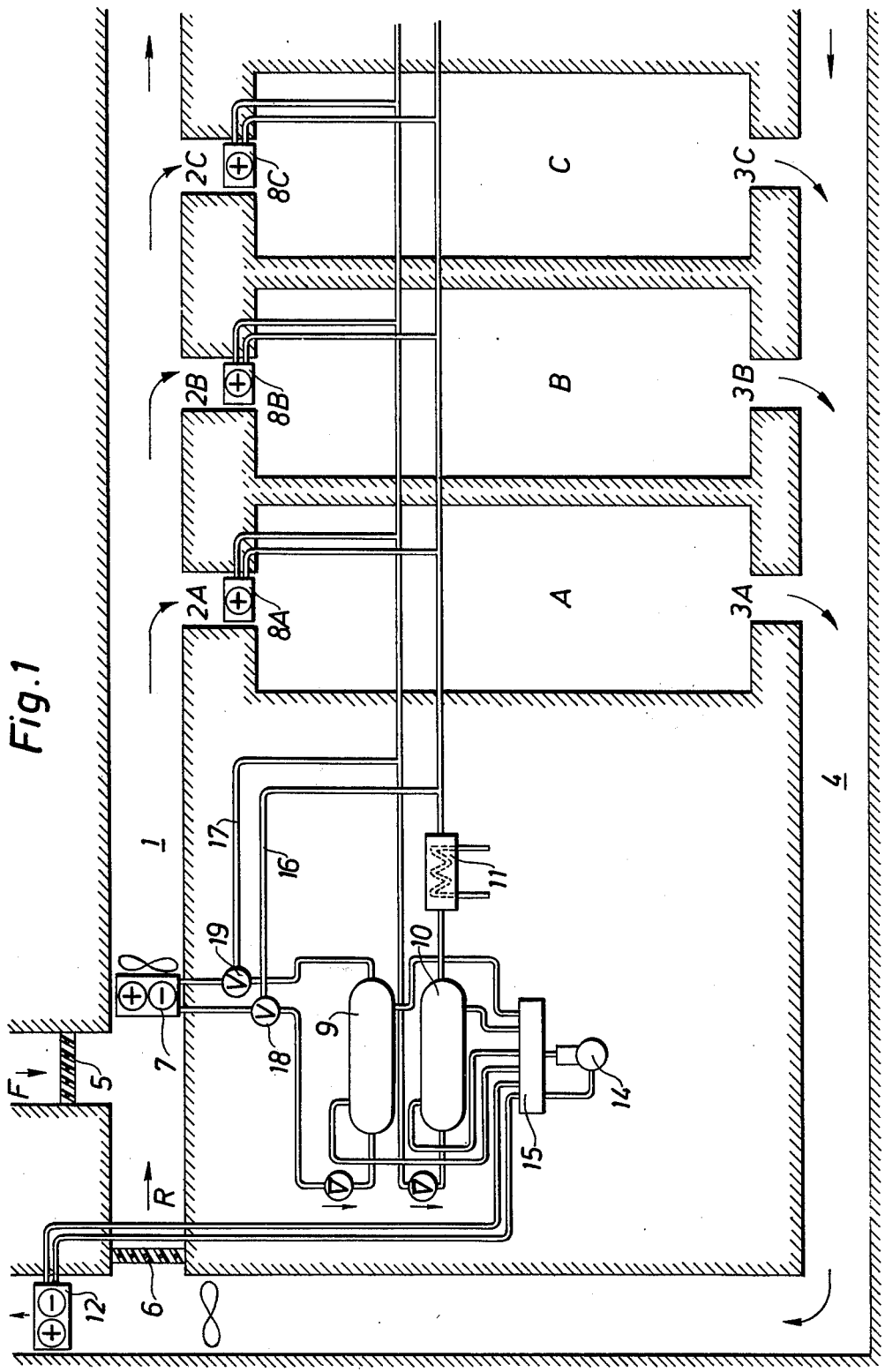

FIG. 1 illustrates an input air duct 1, which is common to several rooms A, B, C which have different heating requirements. Each room has its own air intake duct 2A, 2B and 2C respectively, as well as its own respective air outlet duct 3A, 3B and 3C, these opening into a common outlet air duct 4. Fresh air F and return air R are introduced into the duct 1 through controllable flaps 5 and 6.

A heat-exchanger 7 with associated blower, is arranged in the intake of the duct 1 in order to bring the input air to a temperature which will satisfy the requirement of the room which has the lowest heat requirement per induced unit volume of air.

This means that the air flowing into the other rooms must be heated up by means of after-heating units 8A–C. These units can be thermostatically controlled.

Through the heat-exchanger 7, there flows water which in normal operation is cooled in the water cooler 9.

The units 8A–C are connected in parallel and water flows through them which in normal operation is heated in the water heater 10. An auxiliary heat source 11 is connected in series with the water heater 10. The water cooler 9 is designed as an evaporator in a refrigerator in which the water heater 10 operates as a first condenser. Moreover, the heat pump contains a heater-exchanger 12 which in normal operation operates as a second condenser for the refrigerant which is compressed by a compresser 14.

As described in more detail hereinafter in the context of FIGS. 2 to 4, the refrigerator circuit contains a coupling element 15 performing the switching function for the heat-exchanger 12 when the requirement for cooling of the input air is replaced by a requirement for heating.

In association with this kind of function switching, the cooler 9 is disconnected from its heat-exchanging relationship with the refrigerant, and is instead coupled at the liquid side in parallel with the units 8A–C by the lines 16 and 17 and changeover valves 18 and 19 respectively.

Figure 2:
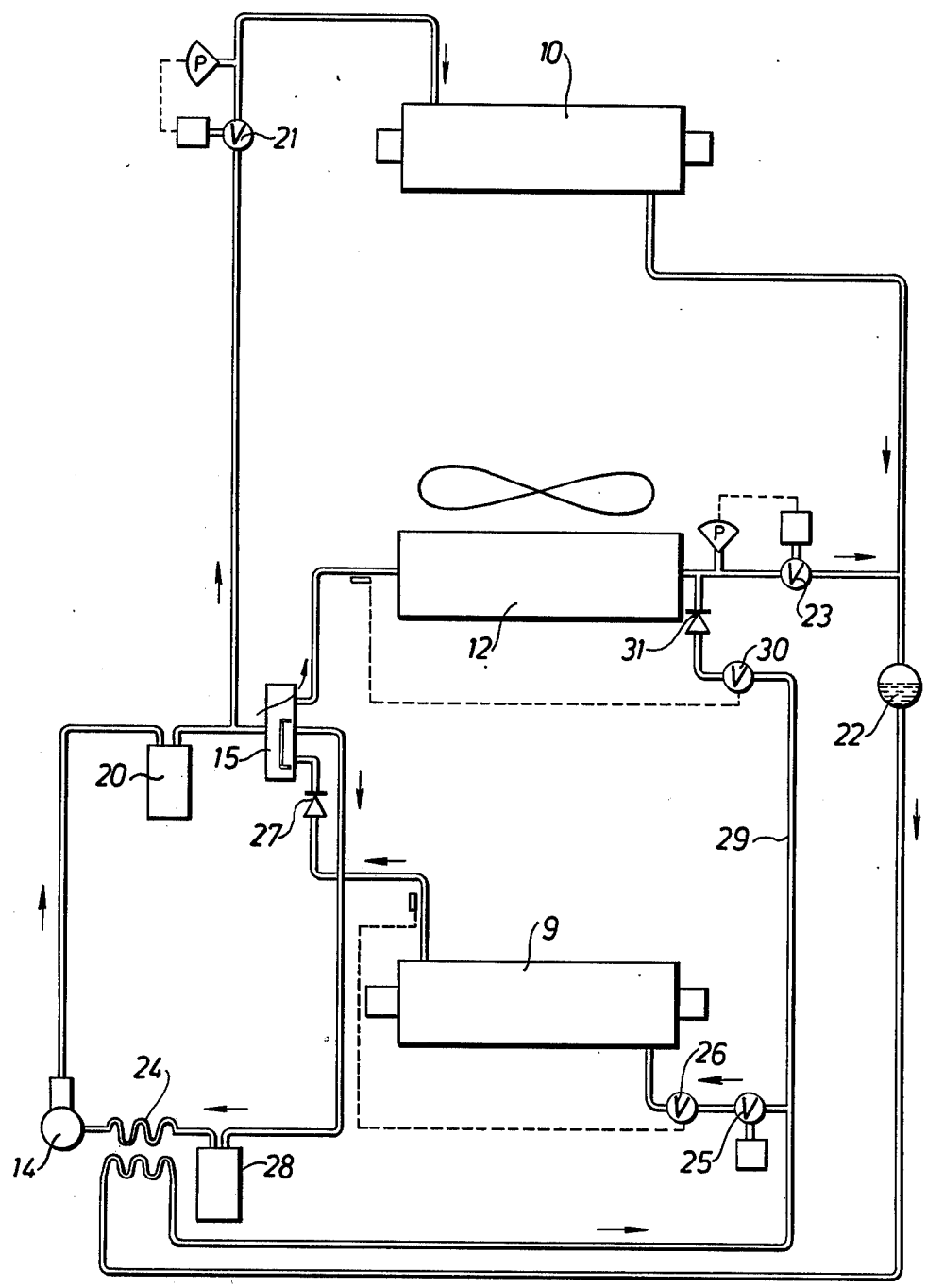

FIG. 2 schematically illustrates the refrigerator indicated in FIG. 1, with the heat exchangers 9, 10 and 12, the coupling valve 15 being set for normal operation in which condition the refrigerant flow follows the path indicated by the arrows.

The refrigerant flows from the compressor 14 through an oil separator 20, after which the flow splits. One sub-flow passes through a pressure-controlled valve 21, the condenser 10 and into the reservoir 22. The other sub-flow passes through the valve 15, the air-cooled condenser 12, a pressure-controlled valve 23 and into the reservoir 22. From the reservoir 22 the refrigerant condensate flows via a heat-exchanger 24 wherein the codensate leaving reservoir 22 is cooled by the condensate entering compressor 14. From heat exchanger 24 the refrigerated condensate then flows through throttle valve 25 and expansion valve 26 to the water-cooler/evaporator 9, whence the refrigerant passes through a check valve 27, the valve 15 and a liquid separator 28, to the compressor 14.

The flow distribution between the heat exchangers 10 and 12 is controlled by the valves 21 and 23 with priority going to the flow through the heat exchanger 10.

A line 29 extends from a point between the condenser 12 and the valve 23, to that part of the refrigerant circuit which carries the condensate. The line 29 contains an expansion valve 30 and a check valve 31. Because of the pressure difference across the check valve 31, however, the latter is closed in normal operation.

Figure 3:
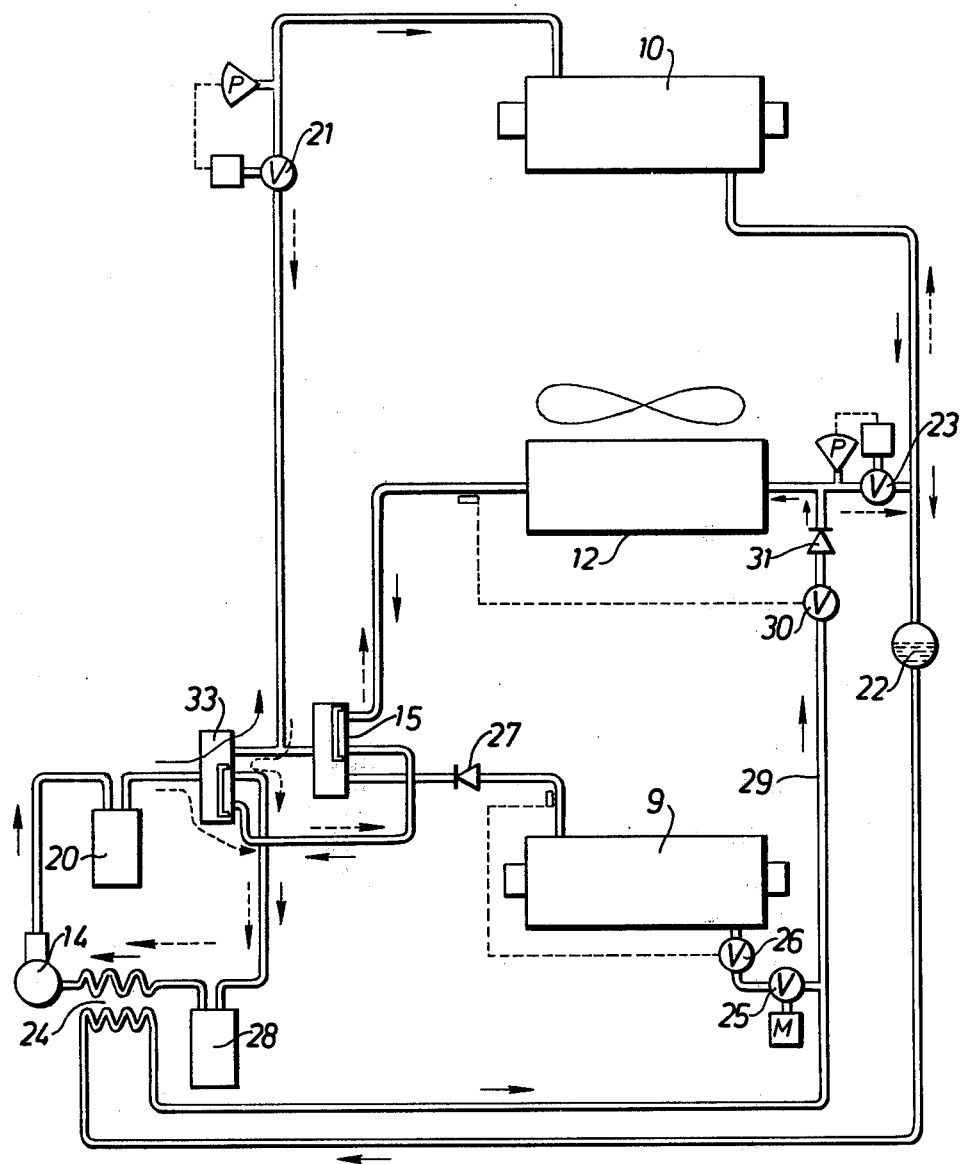
FIG. 3 illustrates a changeover valve designed to defrost the evaporator by reversal of the refrigerant flow in the machine in accordance with FIG. 2, when the latter is operated as a heat pump.

FIG. 3 illustrates a refrigerator corresponding substantially with that shown in FIG. 2.

The four-way valve 15, however, has been switched so that the refrigerator is now operating as a heat pump as may be desirable if the cooling requirement which normally exists, has been replaced by a heating requirement.

The refrigerant flow when the system is operating as a heat pump, has been shown in FIG. 3 by the full-line arrows.

The machine in accordance with FIG. 3 contains further to that of FIG. 2, a second four-way valve 33. The valve 33 is designed in order, after switching from the position shown in FIG. 3, to reverse the refrigerant flow through the heat exchangers 10 and 12, so that the flow then takes the direction indicated by broken-line arrows, causing heat exchanger 12 to be defrosted. When the machine is operating as a heat pump, the valve 25 is maintained closed while the water coil of the heat exchanger 7 is connected to the hot water circuit of the heat exchanger 10 via the valves 18, 19 (see FIG. 1), so that the input airflow can be heated to a base temperature corresponding to the requirement of that room which has the lowest heat requirement per injected unit quantity of air.

Figure 4:
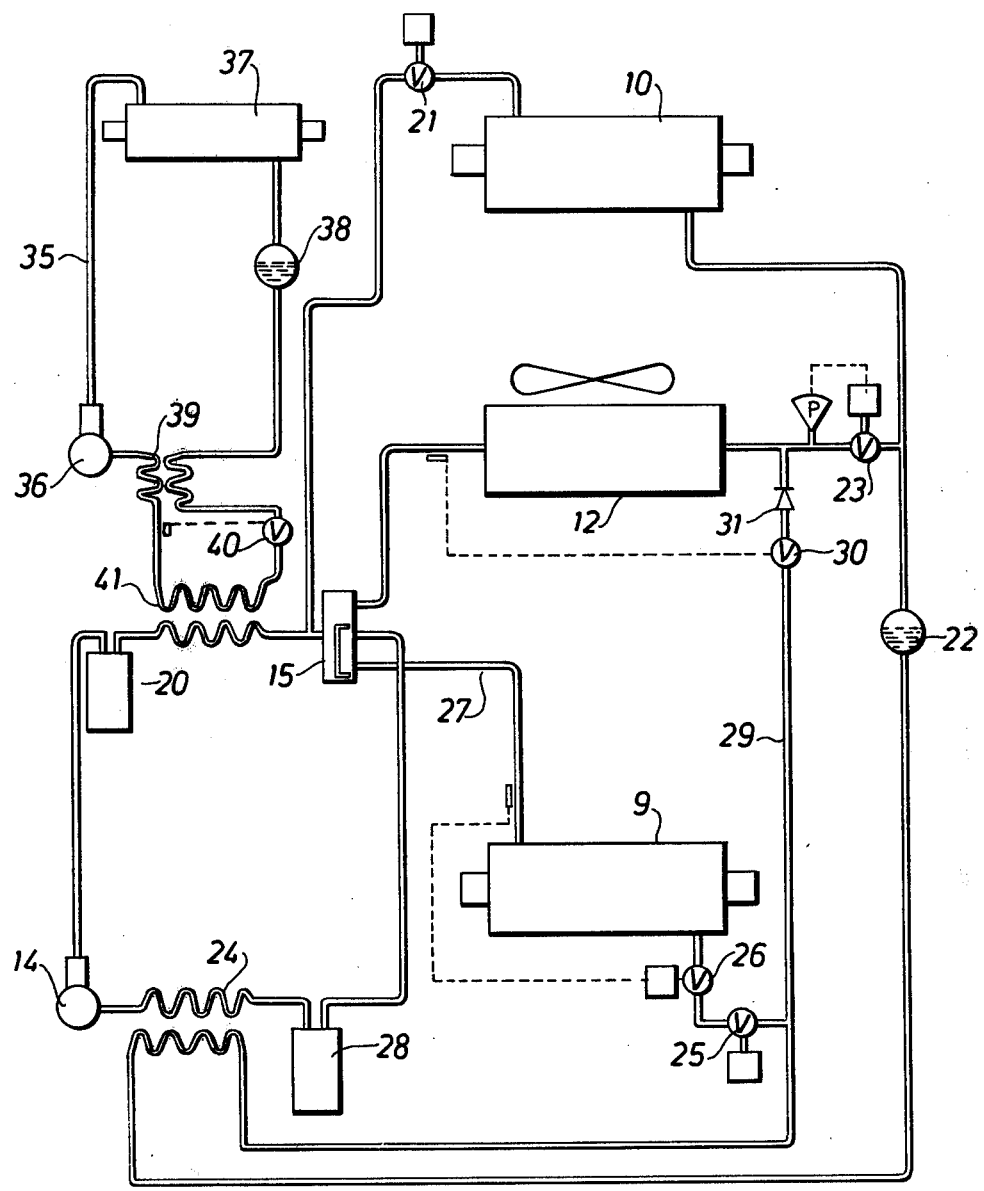
FIG. 4 illustrates the refrigerator of FIG. 2 supplemented by a heat pump designed for example to supply hot tap water.

FIG. 4 illustrates a machine comprising a refrigerator corresponding in all respects to that of FIG. 2. The machine of FIG. 4 additionally contains a heat pump with a refrigerant circuit 35 containing a compressor 36, a condenser 37, a liquid reservoir 38, a condensate heat exchanger 39, an expansion valve 40 and an evaporator 41.

The evaporator 41 is arranged in a heat-exchanging relationship with the hot gas side of the refrigerator circuit, so that a relatively high condensation temperature, for example 80° C, can be maintained in the condensor 37 without any difficulty. The condenser 37 will conveniently be arranged to heat tap water supplies.

Self-evidently, it is also possible in the machine of FIG. 4 (or that of FIG. 2) to employ a reversing valve such as the valve 33 in FIG. 3, in order to defrost the heat exchanger 12 when the machine is operated as a heat pump.

The system in accordance with the invention has been described hereinbefore as a refrigerator, the warm and cold sides of which are in a heat-exchanging relationship with water which is utilised as a heat transfer medium to the heat-exchangers which regulate the temperatures of the air arriving in the rooms. In this fashion, a risk of personnel coming into contact with refrigerant gas is reduced, although it should be clearly understood that within the context of the invention it is possible to dispense with the water system for the transfer of heat/cold from the refrigerator to the input air, and to arrange instead for the warm and cool sides of the refrigerator to be placed in direct heat-exchanging contact with the ventilating air.

What is claimed is:

1. A method for regulating the temperature of a plurality of rooms having mutually differing and varying heating requirements, among which rooms there is normally a cooling requirement, said method comprising:

a. providing a common input airflow for said rooms;

b. contacting said common input airflow with a cyclically evaporated, compressed, and condensed refrigerant in a first heat-exchange zone to transfer a portion of the heat of condensation of the refrigerant to said common input airflow to impart to said common input airflow a heat content corresponding to the requirement of that room having the lowest heat requirement per supplied unit volume of air;
c. dividing said common input airflow into individual air flows to the respective room;
d. contacting each of said individual airflows in separate second heat-exchange zones with said refrigerant to transfer further portions of the heat of condensation of said refrigerant to afterheat, each of said individual airflows to the extent required for the respective rooms;
e. flowing said refrigerant from said second heat-exchange zones to a third heat-exchange zone;
f. providing a common exhaust airflow from said rooms; and
g. contacting said common exhaust airflow in said third heat-exchange zone with said refrigerant to transfer the remainder of the heat of condensation to said common exhaust airflow.

2. A method according to claim 1 wherein, when the cooling requirement is replaced by a heating requirement, said method further comprises switching the first and third heat-exchange zones to exchange their respective functions in relation to the heat transfer between refrigerant vapor and refrigerant condensate, while the common input and exhaust airflows to and from the rooms continue, in said second heat-exchange zones, to transfer part of the heat of condensation of the refrigerant to the separate input airflows to the individual rooms.

3. A method according to claim 1 wherein part of the heat content of the hot compressed refrigerant is utilized for evaporation of a refrigerant in a heat pump, the condensation heat of which is utilized for heating of tap water and for after-heating of the respective input airflows to the individual rooms.

4. A system for regulating the temperature of a plurality of rooms having mutually differing and varying heating requirements, among which rooms there is normally a cooling requirement, said system comprising a common airflow input and exit means and individual airflow input extending from said common input means to each of said plurality of rooms, a refrigerator having a refrigerant circuit including connected evaporator means, compressor means, and condenser means, said evaporator means being connected to a first heat-exchanger via inlet and outlet lines constituting a first liquid circuit, said first heat exchanger being designed to bring said common input airflow to the rooms to a heat level which corresponds to the requirement of the room having the lowest heat requirement per input unit volume of air, said condenser means being connected to a plurality of second, parallel heat-exchangers via a second liquid circuit, said second heat-exchangers being arranged in the input airflow to the respective rooms to afterheat the input airflows to the various rooms to the requisite extent, a third heat-exchanger in the common exit airflow from the rooms for transferring the remaining refrigerant vapour heat to said common exit airflow from the rooms, said inlet and outlet lines for the first heat-exchanger being connected to the second liquid circuit via first and second by-pass lines which extend from the warm and cool side respectively of the second liquid circuit, and coupling means for disconnecting said evaporator device, connecting said third heat exchanger as an evaporator in the refrigerant circuit, and connecting said third heat-exchanger into said second liquid circuit when the cooling requirement is replaced by a heating requirement.

5. A system according to claim 4 wherein the hot out-put refrigerant line from the compressor means of the refrigerator is arranged in heat-exchange relation to the evaporator of a heat pump comprising a refrigerant circuit including connected compressor means, condenser means, and evaporator means, said condenser means of said heat pump being arranged to heat tap water.

6. A system as claimed in claim 4 further comprising an auxiliary heat source connected to said second liquid circuit for supplying auxiliary heat to said second liquid circuit if required.

* * * * *